United States Patent [19]
Tung et al.

[11] Patent Number: 6,034,167
[45] Date of Patent: Mar. 7, 2000

[54] FAST HEATUP POLYESTERS USING GRAPHITE AS AN ADDITIVE

[75] Inventors: William Chung-Tsing Tung, Tallmadge; Joseph P. Schirmer; William George Perkins, both of Akron; Nathan Lyle Pazzo, Medina, all of Ohio

[73] Assignee: Shell Oil Company, Houston, Tex.

[21] Appl. No.: 09/139,694

[22] Filed: Aug. 25, 1998

Related U.S. Application Data

[60] Provisional application No. 60/083,831, May 1, 1998.
[51] Int. Cl.⁷ ...................................................... C08K 3/04
[52] U.S. Cl. ............................................ 524/496; 524/495
[58] Field of Search ...................................... 524/496, 495

[56] References Cited

U.S. PATENT DOCUMENTS

| | | | |
|---|---|---|---|
| 4,245,003 | 1/1981 | Oransky et al. | 428/323 |
| 4,408,004 | 10/1983 | Pengilly | 524/496 |
| 4,711,834 | 12/1987 | Butters et al. | 430/201 |

OTHER PUBLICATIONS

Brady, Materials Handbook, 12th Edition, McGraw, p. 369, 1986.

*Primary Examiner*—David W. Wu
*Assistant Examiner*—Ling-Siu Choi

[57] ABSTRACT

A polyester resin is disclosed containing graphite in sufficient quantities to reduce its infrared heat up time in the reheat-blow process. The amount of graphite added is from 0.1 to 15 ppm and the average particle size is from 0.1 to 20 microns. The polyester is useful to make bottle preforms for beverage containers. Methods of making the polyester resin are also disclosed using a masterbatch or liquid slurry addition technique.

21 Claims, 4 Drawing Sheets

GRAPHITE (CRYSTALLINE)

CARBON BLACK (AMORPHOUS)

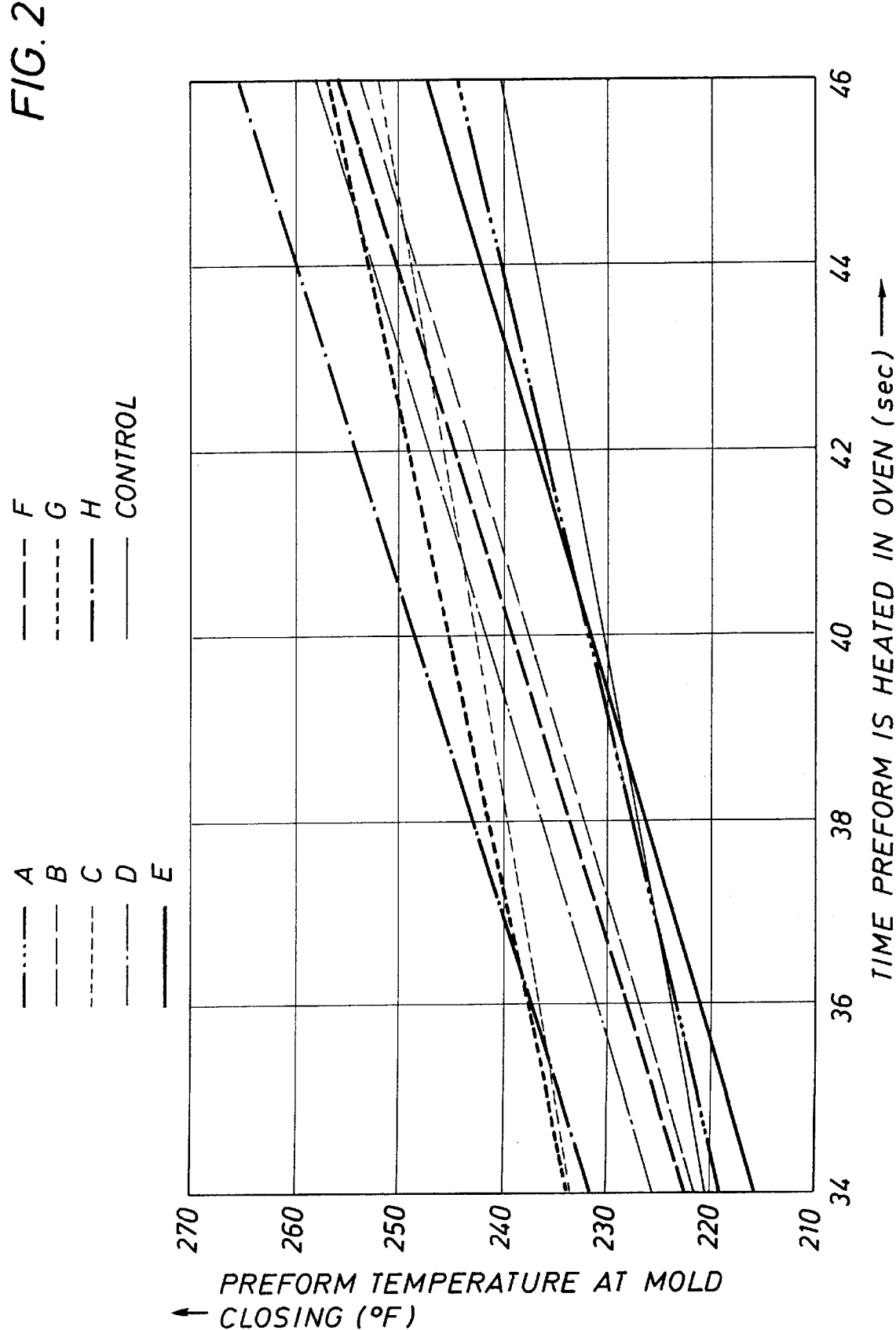

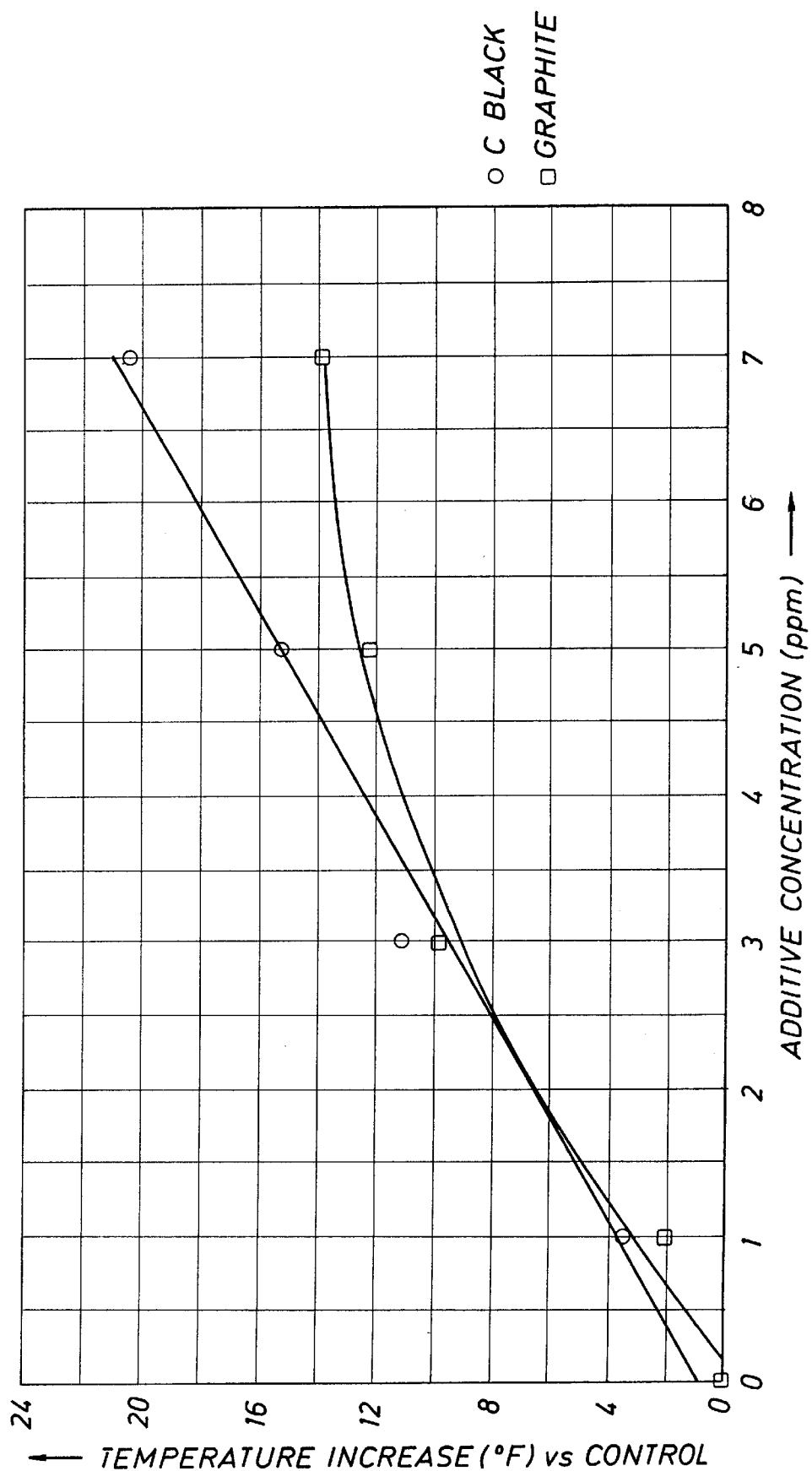

FAST HEATUP POLYESTERS USING GRAPHITE AS AN ADDITIVE

This application claims the benefit of U.S. Provisional application Ser. No. 60/083,831, filed May 1, 1998, the entire disclosure of which is hereby incorporated by reference.

FIELD OF THE INVENTION

The present invention relates to polyesters, mainly PET (polyethylene terephthalate), which exhibit fast heatup rates as a result of an additive comprised of graphite. The faster heatup rate reduces time necessary to manufacture beverage containers from PET when a reheat-blow process is used.

BACKGROUND OF THE INVENTION

Many methods have been formulated to reduce infrared radiation heatup times, especially with respect to polyester bottle preforms. Some of these methods comprise the incorporation of sufficient phosphite compounds to chemically reduce indigenous antimony compounds to their elemental state.

Other patents have provided for the addition of compounds such as iron oxides and/or anthraquinone dyes. Compounds consisting of carbon black have been added to PET to reduce the infrared heatup times of bottle preforms. U.S. Pat. Nos. 4,408,004, 4,476,272, and 4,535,118 exemplify the parameters that are necessary for the carbon black to significantly affect heatup rates. The amount of carbon black from these disclosures ranges from 0.1 to about 8 parts per million by weight based on the weight of the polyester resin. The two species of carbon black disclosed are channel black and furnace black.

One systematic problem with the use of carbon black is the concern about its fine particle size that can easily become airborne during even the slightest process upset. Another problem is the dark hue imparted to objects containing even small amounts of carbon black. Thus, the search for different effective additives other than carbon black have led applicants to the unexpected finding that graphite, a different species of carbon than carbon black, unexpectedly outperforms carbon black relative to the balance of properties required in a faster heatup polyester resin.

Thus the object of this invention is to provide a polyester resin composition which will yield aesthetically acceptable bottle preforms and which will minimize infrared radiation preform heatup time.

BRIEF DESCRIPTION OF THE INVENTION

High clarity polyesters are disclosed which contain a small amount of an infrared radiation absorbing material, the amount of said material being sufficiently low that beverage bottle preforms made from said polyesters have essentially neutral color and high brightness.

More specifically, this invention comprises poly(ethylene terephthalate), PET, containing graphite, which allows faster beverage bottle preform heatup times when exposed to infrared radiation.

DETAILED DESCRIPTION OF THE INVENTION

Figure 1:
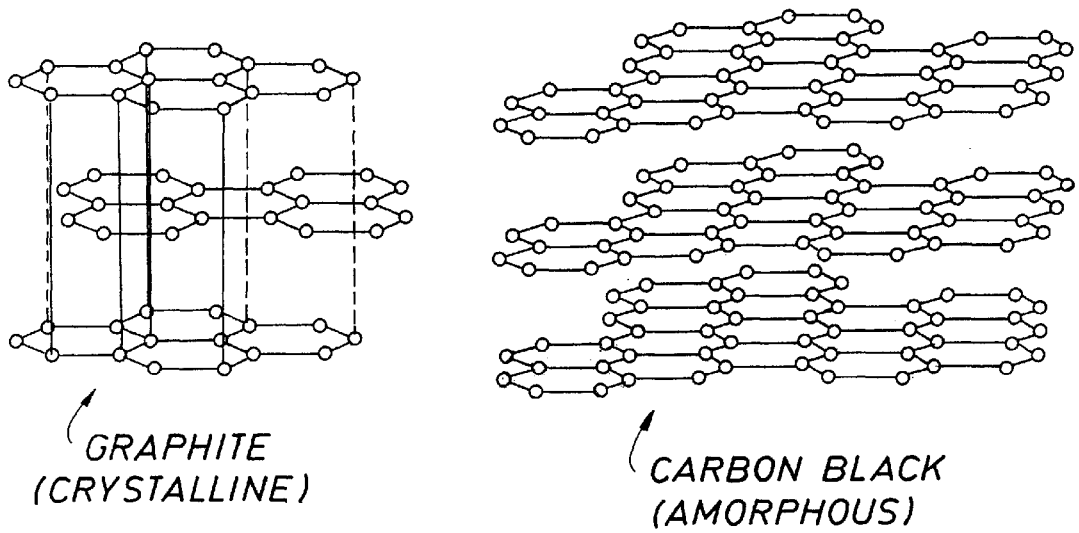

During the last 15 to 20 years, PET containers have been used extensively in the sale of beverages. These containers have all but replaced glass, especially in two-liter soft-drink bottles.

Polyester beverage bottles such as those used for carbonated soft drinks are generally manufactured via a process comprising injection molding of a "bottle preform" and subsequently blow molding said bottle preform into the final bottle shape. This process may be run using a single machine, or in two stages, by using an injection molding machine to produce the bottle preforms, and a blow molding machine to form the bottles from preforms which have been (re)heated to enhance formability.

Many bottle fabricators buy bottle preforms from preform suppliers, and then blow mold the beverage bottles for subsequent sale to commercial bottlers. These bottle fabricators require clear bottle preforms having low (neutral) color and a high degree of brightness. They also require the fastest possible bottle preform heatup times, to minimize process cycle time and thus maximize bottle production during the blow molding operation.

The PET is usually made by resin manufacturers that sell their resins to converters who, in turn, make PET bottle preforms that are subsequently "blown" into bottles for filling with beverages for sale to the public. In order to form the final bottles, the preforms are heated in the presence of infrared radiation prior to the blowing operation. The preform heatup time is a critical limiting step in determining the number of preforms that can be blown into suitable containers over a certain amount of time. In addition, the final blown bottles must have certain color and brightness as measured by a spectrocolorimeter.

Polyester Polymers and Copolymers

The polyester polymers and copolymers of this invention are prepared by the reaction of a diol having from 2 to 8 carbon atoms with a dicarboxylic acid, or its corresponding ester. Specific acids/esters include the phthalic acids/esters and naphthalic acids/esters. These acids/esters are reacted with a glycol having from 2 to 8 carbon atoms or glycol ethers having from 4 to 10 carbon atoms. Generally, the most common polyesters are poly(ethylene terephthalate) formed from the approximate 1:1 stoichiometric reaction of terephthalic acid, or its ester, with ethylene glycol. Another common polyester is poly(ethylene naphthalate) formed from the approximate 1:1 stoichiometric reaction of naphthalene dicarboxylic acid, or its ester, with ethylene glycol.

It is also understood that an esterification or polycondensation reaction of the carboxylic acid/ester with glycol typically takes place in the presence of a metal catalyst. The preferred metal catalyst is antimony oxide although other metals such as tin and germanium may also be used. The metal catalyst that is selected may result in a quantity of the elemental metal present in the final polymer product. The residual amount of metal, such as antimony, will be present in the final polymer in a quantity of about 50 to 400 parts per million (ppm) based on the weight of the polymer either in an oxidized form or a chemically reduced form.

The polymer of this invention may also contain small amounts of phosphorous compounds, such as phosphate, and catalysts such as a cobalt compound, that tends to impart a blue hue.

The polyesters can be converted to any form such as films, sheets, containers, fibers, but the preferred form is bottles for holding soft drinks, mineral water, beer, orange juice and the like.

Graphite Additive

It has been unexpectedly found that graphite functions as an effective additive to reduce polyester bottle preform heatup time, while maintaining color and brightness better than carbon black. The amount of graphite added to accomplish the desired reduction in heatup time is preferably between 0.1 and 15 ppm, more preferably between 0.5 to 10 ppm, and most preferably between 1.0 to 7.0 ppm based on the weight of the polymer. The graphite has a typical average particle size ranging from 0.1 microns to 20 microns with the preferred size being 1.0 microns to 10 microns. The graphite can be added at any stage of the polymer preparation such as during the esterification, transesterification, or polycondensation reaction to make the melt phase polymer. The graphite may also be added during any post polymerization melt processing operation.

One preferred method of adding the graphite is as a solid masterbatch. In the masterbatch preparation, the graphite is added to a quantity of polyester under defined conditions to insure that the graphite is dispersed relatively uniformly in the masterbatch. This graphite-loaded polyester masterbatch is then added to the polymerization reactor at the most opportune point of addition, including but not limited to esterification, transesterification, or polycondensation. Another route is the addition of graphite by means of a liquid slurry. A disadvantage of graphite herein is that its greater density makes it more difficult to add to the polyester polymerization reactor as a liquid slurry with a carrier, compared with less dense materials. Alternatively, graphite may be added in a melt-blending extrusion operation, or any other post-polymerization melt processing step.

While carbon black and graphite are both forms of carbon, they chemically and structurally display more differences than they have in common. Most significantly, carbon black possesses an amorphous structure while graphite possesses a crystalline structure. The following table exemplifies the very different properties of these two forms of carbon.

TABLE 1

TYPICAL PROPERTIES OF GRAPHITE AND CARBON BLACK

| Property | Graphite | Carbon Black |
|---|---|---|
| Particle size of a single particle | 1 to 10 microns | 0.01 to 0.1 microns |
| Agglomerates typically consist of; | Single particles and occasionally clusters containing only a few single particles | Chains or clusters containing up to 100 single particles |
| Specific surface area | 20 m$^2$/g | 25 to 1500 m$^2$/g |
| Structure | Crystalline | Amorphous |
| Density | 2.2 g/cm$^3$ | 1.6 to 2.0 g/cm$^3$ |
| Color | Dark gray | Black |
| pH | 3 to 9 | 5 to 6 |

A crystallographic depiction of the two forms of carbon is shown in FIG. 1. It is well recognized by those skilled in the art that the two forms of carbon are not interchangeable when used in industry any more than carbon black is interchangeable with diamond, or diamond dust, another crystalline form of carbon.

Aesthetics Determination

The color and brightness of a polyester article can be observed visually, and can also be quantitatively determined by a HunterLab ColorQUEST® Spectrocolorimeter, using reflectance specular included, with a 2° observer angle and a D65 illuminant. This instrument uses the 1976 CIE a*, b*, L* designations of color and brightness determination such that an a* coordinate defines a color axis wherein plus values are towards the red end of the spectrum and minus values are toward the green end; a b* coordinate, which defines a second color axis, wherein plus values are towards the yellow end of the spectrum and minus values are toward the blue end; and an L* coordinate wherein higher values indicate enhanced brightness of the material.

The color with regard to polyester bottle preforms having a nominal sidewall cross-sectional thickness of about 0.125 inch (3.175 millimeters) is generally indicated by an a* coordinate value ranging from about minus 3.0 to about plus 3.0, more preferably from about minus 2.0 to about plus 2.0, and most preferably from about minus 1.0 to about plus 1.0; and a b* coordinate value ranging from about minus 5.0 to about plus 7.0, more preferably from about minus 4.0 to about plus 4.0, and most preferably from about minus 3.0 to about plus 3.0. Thus, it is preferred that the bottle preform is essentially neutral or colorless in hue (as measured on a sample having a sidewall cross sectional thickness of about 0.125 inches).

The brightness of the bottle preforms discussed above is measured on the L* coordinate axis wherein higher values denote greater brightness. L* values for the bottle preforms discussed herein should generally be greater than 65.0, more preferably greater than 70.0, and most preferably greater than 75.0 (as measured on a sample having a sidewall cross sectional thickness of about 0.125 inches).

EXAMPLE

The following example demonstrates the unexpected ability of graphite to reduce heatup time while maintaining color and brightness better than carbon black.

A PET resin was prepared by reacting terephthalic acid and ethylene glycol to make a melt phase polymer, sometimes referred to as a feed polymer. This low molecular weight feed polymer was crystallized and solid state polymerized to prepare a high molecular weight PET base resin. A quantity of 50 ppm masterbatch of either carbon black or graphite was added to the base resin to achieve levels of 1, 3, 5 and 7 ppm as shown in Table 2.

TABLE 2

ADDITIVE LEVELS AND REQUIRED WEIGHTS OF MASTERBATCH AND BASE RESIN

| Additive level, ppm | Weight of 50 ppm masterbatch, g | Weight of base resin, g |
|---|---|---|
| 1 | 54 | 2670 |
| 3 | 163 | 2560 |
| 5 | 272 | 2452 |
| 7 | 381 | 2342 |

The base resin/masterbatch mixtures from Table 2 were dried under vacuum at 325° F. for 18 hours. Thereafter, the dried resin was transferred to a Novotec drying hopper of a Nissei ASB 50T Injection Blow-Molding machine. The hopper was heated to 325° F. and set for a dew point of −40° F. Typical settings on the Nissei machine used to make the bottle preforms are set forth in Table 3.

NISSEI ASB-50T MOLDING MACHINE

| 11.5 | sec. | INJECTION TIMER, TM-07 |
| 6.0 | sec. | COOLING TIMER, TM-09 |

| 260 | ° C. | BARREL NOZZLE |
| 260 | ° C. | BARREL FRONT |
| 255 | ° C. | BARREL MIDDLE |
| 250 | ° C. | BARREL REAR |
| 265 | ° C. | HOT RUNNER NOZZEL |
| 265 | ° C. | HOT RUNNER BLOCK |
| -40 | ° C. | CONAIR LIQUID CHILLER |

| 130 | R.P.M | SCREW ROTATION |

YUKEN KOGYO (SK1046) PROGRAM CONTROLLER

| 90 | % | SCREW | 028.0 | mm | SHOT SIZE |
| 18 | % | V1 | 023 | mm | X(V1→ V2) |
| 18 | % | V2 | 018 | mm | X(V2→ V3) |
| 15 | % | V3 | 15.0 | mm | S-MONITOR |
| 9 |  | F. DIAL | 00.0 | mm | O-MONITOR |
|   |   |   | 15.0 | mm | X(P1→ P2) |
| 100 | Kgf/cm² | P1 |   |   |   |
| 60 | Kgf/cm² | P2 | 01.0 | sec. | TP2 |
| 40 | Kgf/cm² | P3 | 05.0 | sec. | TP3 |
| 9 |   | P. DIAL |   |   |   |

The bottle preforms were heated and blown into bottles in a one-step process on a Cincinnati Milacron Reheat Blow Lab (RHB-L) blow molding machine. The oven temperature profile, environmental conditions, innate physical properties, and the number of bottle preforms, allowed reheat times to be measured in 4 second intervals, with 42 seconds common to all samples. Reheat of the bottle preforms in the oven was followed by 8 seconds of thermal equilibration at the RHB-L mold/blow position. Bottle preform surface temperatures were recorded with a FLIR System's Prism DS thermal imaging system from the start of the preform thermal equilibration period to the moment of mold closing.

The image of a preform was viewed electronically in six equal sections from just below the thread area to just above the curvature of the base. Each of the sections was visually constrained to a width exclusive of the thickness of the bottle preform walls, as seen in two dimensions. The surface temperature of a preform was then recorded as an average of all the thermal detector readings in the third section down from the top of the preform, just before the mold closing of the RHB-L.

Table 4 contains bottle preform heatup data, including temperature differentials, from samples A through I (control). The table shows bottle preform temperatures at various times in the reheat oven. These data may be linearly regressed and are thus plotted in FIG. 2 where the bottle preform temperature at the time of mold closing is plotted against the time spent in the reheat oven.

Values for the regressed data are also given in Table 4. Because the typical oven heating time for the 16-oz bottle preforms used in this example, required to blow a bottle with no visible haze, was 42 seconds, the heatup behavior at 42 seconds was routinely compared in order to differentiate one sample from another. The 42-second temperature increases from the control resin are shown in Table 4, and plotted in FIG. 3, illustrating the difference in 42-second heatup behavior between graphite and carbon black. While carbon black shows a linear relationship, the effect of graphite appears to plateau above 5 ppm.

TABLE 4

HEATUP RESULTS OF BOTTLE PREFORMS CONTAINING GRAPHITE OR CARBON BLACK

|  | GRAPHITE | | | | CARBON BLACK | | | | CONTR |
| --- | --- | --- | --- | --- | --- | --- | --- | --- | --- |
|  | A | B | C | D | E | F | G | H | I |
| Graphite, ppm | 1 | 3 | 5 | 7 |  |  |  |  | 0 |
| Carbon Black, ppm |  |  |  |  | 1 | 3 | 5 | 7 | 0 |
| Preform Heating Time |  |  |  |  |  |  |  |  |  |
| 34 sec. | 217.6 | 213.5 | 231.6 | 223.0 | n/a | 220.1 | 228.2 | 229.5 | 222.1 |
| 38 sec. | 231.0 | 236.5 | 240.6 | 237.8 | 227.2 | 231.8 | 238.9 | 244.2 | 226.9 |
| 38 sec. | 226.6 | 238.2 | 238.0 | 239.2 | 225.8 | 237.3 | 247.6 | 243.8 | 223.5 |
| 38 sec. Average | 228.8 | 237.3 | 239.3 | 238.5 | 226.5 | 234.5 | 243.2 | 244.0 | 225.2 |
| 42 sec. | 235.2 | 241.2 | 244.7 | 248.8 | 239.7 | 246.3 | 253.5 | 254.3 | 231.2 |
| 42 sec. | 235.0 | 248.6 | 248.8 | 246.2 | 234.0 | 244.8 | 248.9 | 253.8 | 236.4 |
| 42 sec. Average | 235.1 | 244.9 | 246.7 | 247.5 | 236.8 | 245.6 | 251.2 | 254.1 | 233.8 |
| 46 sec. | n/a | 249.1 | 251.0 | 256.7 | n/a | 254.0 | 252.6 | 264.4 | 241.0 |
| Regressed Temperature (° F.) at 42 seconds | 235.8 | 243.4 | 245.8 | 247.4 | 236.8 | 244.7 | 249.0 | 254.0 | 233.5 |
| Regressed Temperature Increase over the control @ 42 seconds | 2.3 | 9.9 | 12.3 | 13.9 | 3.3 | 11.2 | 15.5 | 20.5 | 0.0 |

TABLE 5

COLOR AND BRIGHTNESS OF BOTTLE PREFORMS CONTAINING GRAPHITE OR CARBON BLACK

|  | GRAPHITE | | | | CARBON BLACK | | | | CONTROL |
| --- | --- | --- | --- | --- | --- | --- | --- | --- | --- |
|  | A | B | C | D | E | F | G | H | I |
| Graphite, Carbon Preform | 1 | 3 | 5 | 7 | 1 | 3 | 5 | 7 | 0 0 |
| a* | −0.9 | −0.9 | — | −0.8 | −0.8 | −0.5 | −0.1 | +0.5 | −0.9 |
| b* | 5.9 | 6.5 | 6.4 | 6.7 | 6 3 | 7.9 | 9.9 | 12.1 | 5.7 |
| Preform (L*) | 78.5 | 75.3 | 73. | 69.5 | 78.7 | 74.1 | 66.4 | 57.5 | 80.5 |

Figure 4:
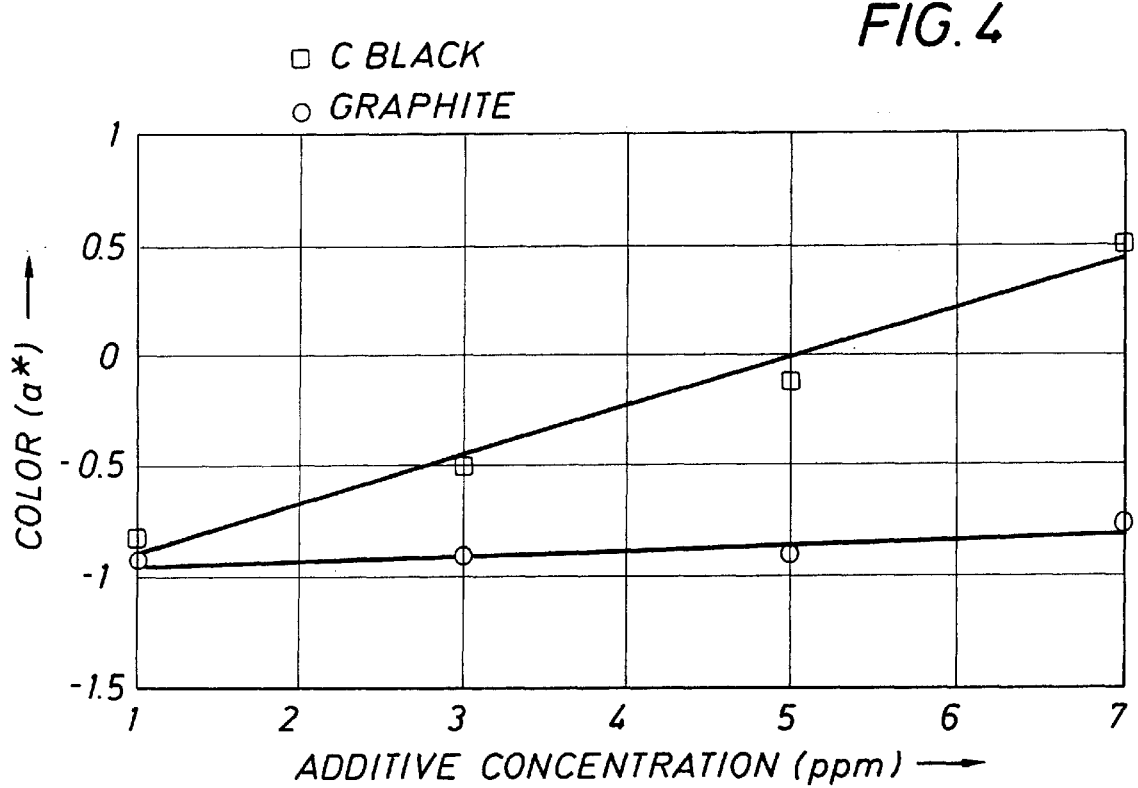

The color and brightness difference between graphite and carbon black-loaded bottle preforms is quite significant. The effect of additive concentration on a* color is seen in FIG. 4. Graphite gives essentially no change in a* color with increasing concentration, whereas carbon black significantly raises a* values with increasing concentration.

Figure 5:
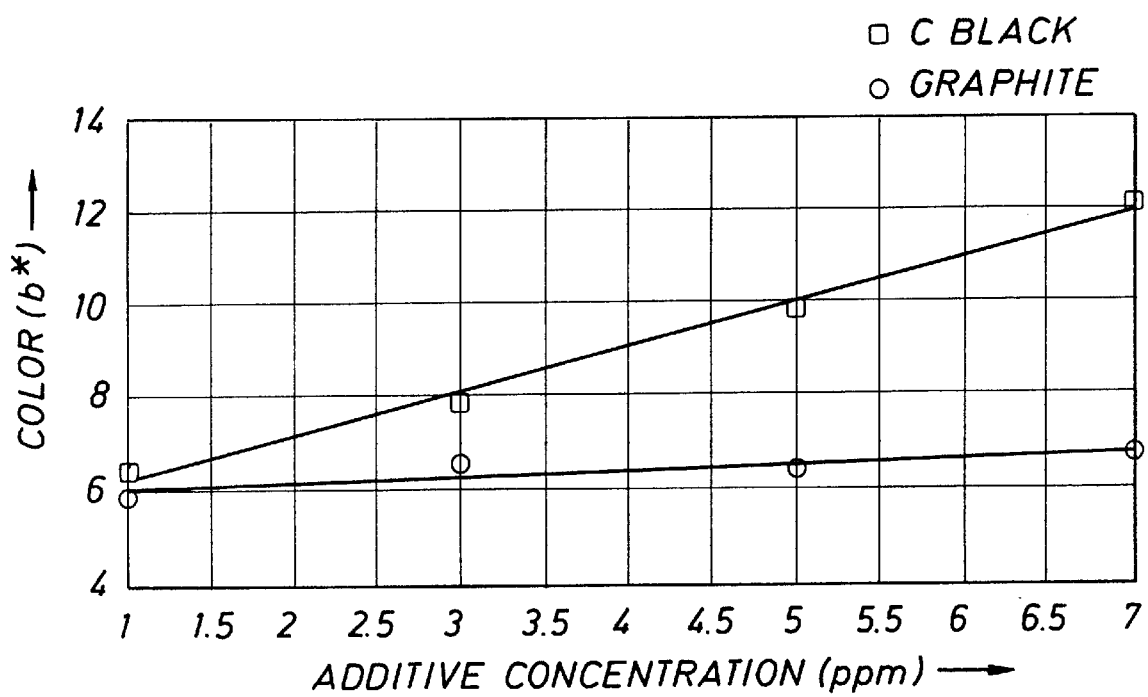

FIG. 5 shows an identical effect on b* color. It is apparent that graphite has a negligible effect on b* over the range of 1 to 7 ppm, whereas carbon black shows a 100% increase in b* color over this concentration range.

Figure 6:
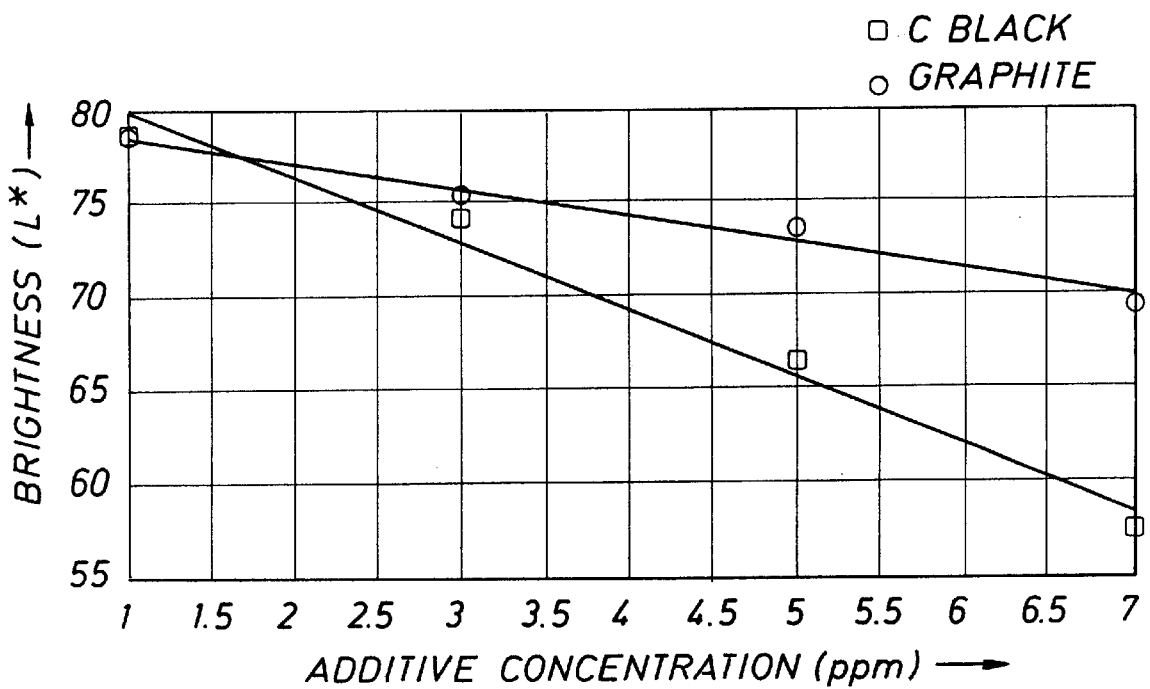

The results for L*, the measure of brightness, are shown in FIG. 6. While the relationship between L* and increasing additive concentration is linear for both carbon black and graphite, the latter shows a much less negative slope, indicating that graphite does not produce as dark a bottle preform at equal additive concentrations. This is extremely important to bottle preform suppliers, as bottle fabricators require bright preforms.

Color and brightness values (a*, b*, and L*) for bottle preforms illustrated in this example can be found in Table 5.

What is claimed as our invention is as follows:

1. A high clarity polyester comprising: a polyester, said polyester having a small amount of an infrared absorbing material wherein said infrared absorbing material is graphite, wherein the amount of said graphite is present from about 0.1 to 15 parts by weight per million parts by weight of said polyester, wherein said graphite has an average particle size of from about 0.1 to about 20 microns, and wherein said polyester, exclusive of other added colorants, has a Hunter a* coordinate value of from about minus 2.0 to 2.0, a Hunter b* coordinate value of from about minus 3.0 to 2.0, and a Hunter L* value of greater than about 65.

2. A high clarity polyester, according to claim 1, wherein said polyester is made by the reaction of one or more dicarboxylic acids having from 8 to 40 carbon atoms, or the esters thereof, with one or more diols having from 2 to 8 carbon atoms, or glycol ethers having from 4 to 10 carbon atoms.

3. A high clarity polyester, according to claim 2, wherein said polyester is comprised of at least 80 percent poly (ethylene terephthalate).

4. A high clarity polyester, according to claim 2, wherein said polyester is poly(ethylene naphthalate).

5. A high clarity polyester, according to claim 2, wherein said polyester is in the shape of a preformed article.

6. A high clarity polyester, according to claim 5, wherein said polyester has improved infrared heatup times.

7. A high clarity polyester, according to any one of claims 2–6, wherein said polyester is in the form of a high clarity article.

8. A high clarity polyester, according to claim 7, wherein said high clarity article is a beverage bottle.

9. A high clarity polyester, according to claim 5, wherein the amount of graphite ranges from about 0.1 to about 15 parts by weight per million parts by weight of said polyester, and wherein said graphite average particle size ranges from about 0.1 to about 20 microns and wherein said Hunter a* coordinate value is from about minus 3.0 to 3.0, and wherein said Hunter b* coordinate value is from about minus 5.0 to about 7.0, and wherein said Hunter L* coordinate value is greater than 65, as measured on a molded bottle preform having a sidewall cross-sectional thickness of about 0.125 inch.

10. A high clarity polyester, according to claim 5, wherein the amount of graphite ranges from about 1 to about 7 parts by weight per million parts by weight of said polyester, and wherein said graphite average particle size ranges from about 1 to about 10 microns and wherein said Hunter a* coordinate value is from about minus 1.0 to about 1.0, and wherein said Hunter b* coordinate value is from about minus 3.0 to about 3.0, and wherein said Hunter L* coordinate value is greater than about 75, as measured on a molded bottle preform having a sidewall cross-sectional thickness of about 0.125 inch.

11. A method of making a polyester resin which comprises reacting one or more dicarboxylic acids or their esters with one or more glycols having from 2 to 8 carbon atoms wherein during the esterification, transesterification, or polycondensation of said reactants, graphite in a quantity of 0.1 ppm to 15 ppm by weight of the polymer and having a size of 0.1 microns to 20 microns is added by means of a solid masterbatch or liquid slurry to said polymer.

12. The method of claim 11 wherein one of the said dicarboxylic acids is a phthalic acid, or its ester and one of the said glycols is ethylene glycol.

13. The method of claim 11 wherein said graphite is present in an amount of 1.0 ppm to 7.0 ppm.

14. The method of claim 11 wherein the graphite possesses a size of 1.0 microns to 10 microns.

15. A method of making a polyester compound which comprises reacting a phthalic or naphthalic acid/ester with a glycol having 4 to 10 carbon atoms to form a polyester melt polymer and thereafter adding in a melt-blending extrusion operation graphite in a quantity of 0.1 to 15.0 ppm based on the weight of the polymer, wherein said graphite possesses a particle size of 0.1 microns to 20 microns.

16. The method of claim 15 wherein said addition of said graphite is made by a masterbatch addition to the melt-blending extrusion operation.

17. The method of claim 15 wherein said graphite is present in a quantity of 1.0 ppm to 7.0 ppm and possesses a micron size of from 1.0 microns to 10 microns.

18. The method of claim 11 wherein said reaction of said dicarboxylic acids/esters and glycols takes place in the presence of a metal catalyst in an amount of 50 to 400 ppm based on the weight of the polymer.

19. The method of claim 18 wherein said metal compound comprises an antimony compound, preferably antimony oxide.

20. The method of claim 15 wherein said phthalic or naphthalic compounds and said glycol are reacted in the presence of a metal catalyst in an amount of 50 to 400 ppm based on the weight of the polymer.

21. The method of claim 20 wherein said metal compound comprises an antimony compound, preferably antimony oxide.

* * * * *